(12) United States Patent
Van Dingenen et al.

(10) Patent No.: US 12,351,032 B2
(45) Date of Patent: Jul. 8, 2025

(54) ELECTRIC CONTINUOUSLY VARIABLE TRANSMISSION AND METHODS THEREFOR

(71) Applicant: Dana Belgium N.V., Bruges (BE)

(72) Inventors: Joachim Van Dingenen, Drongen (BE); Kurt Cattoor, Koolkerke (BE); Filip Van Raepenbusch, Bruges (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 18/467,611

(22) Filed: Sep. 14, 2023

(65) Prior Publication Data

US 2025/0091427 A1    Mar. 20, 2025

(51) Int. Cl.
*B60K 17/28* (2006.01)
*B60K 6/365* (2007.10)
(Continued)

(52) U.S. Cl.
CPC .......... *B60K 6/40* (2013.01); *B60K 6/365* (2013.01); *B60K 6/547* (2013.01); *B60K 17/28* (2013.01); *F16H 37/065* (2013.01); *F16H 57/02* (2013.01); *F16H 61/68* (2013.01); *B60K 6/543* (2013.01); *B60Y 2200/92* (2013.01); *F16H 2057/02034* (2013.01); *F16H 2057/02047* (2013.01); *F16H 2057/02056* (2013.01); *F16H 2200/0004* (2013.01); *F16H 2200/0034* (2013.01); *F16H 2200/0039* (2013.01); *F16H 2200/0082* (2013.01); *F16H 2200/0086* (2013.01);
(Continued)

(58) Field of Classification Search
CPC .......... B60K 6/40; B60K 6/365; B60K 6/547; B60K 6/543; B60K 17/28; F16H 37/065; F16H 57/02; F16H 61/68; F16H 2057/02034; F16H 2057/02047; F16H 2057/02056; F16H 2200/0004; F16H 2200/0034; F16H 2200/0039; F16H 2200/0082; F16H 2200/0086; F16H 2200/2038; F16H 2200/2041; B60Y 2200/92

See application file for complete search history.

(56) References Cited

U.S. PATENT DOCUMENTS 5,669,842 A * 9/1997 Schmidt ............... B60K 6/365
                                                    903/910
7,252,611 B2   8/2007 Raghavan et al.
(Continued)

FOREIGN PATENT DOCUMENTS

| DE | 102011085149 A1 | 4/2013 |
| DE | 102021206523 A1 | 12/2022 |
| DE | 102021211820 A1 | 4/2023 |

*Primary Examiner* — Farhana Pervin
(74) *Attorney, Agent, or Firm* — McCoy Russell LLP

(57) ABSTRACT

In one example, an assembly is provided comprising a transmission at least partially enclosed in a housing. The transmission includes a planetary gear set coupled to a multispeed sub-transmission. The planetary gear set is configured to be coupled to a first electric machine and an internal combustion engine on a first side, and configured to be coupled to a second electric machine on a second side, where the first side and the second are defined by a vertical plane that is perpendicular to a central axis of rotation of the planetary gear set. The first electric machine, the second electric machine, and the internal combustion engine are arranged outside of the housing.

16 Claims, 7 Drawing Sheets

(51) Int. Cl.
*B60K 6/40* (2007.10)
*B60K 6/547* (2007.10)
*F16H 37/06* (2006.01)
*F16H 57/02* (2012.01)
*F16H 61/68* (2006.01)
*B60K 6/543* (2007.10)

(52) U.S. Cl.
CPC ............... *F16H 2200/2038* (2013.01); *F16H 2200/2041* (2013.01)

(56) References Cited

U.S. PATENT DOCUMENTS

| | | | | |
|---|---|---|---|---|
| 8,469,127 B2* | 6/2013 | Tarasinski | ............... | B60K 6/26 |
| | | | | 180/65.285 |
| 8,944,194 B2 | 2/2015 | Glaser et al. | | |
| 2001/0051556 A1* | 12/2001 | Takenaka | ................ | B60K 6/36 |
| | | | | 903/952 |
| 2014/0194238 A1* | 7/2014 | Ono | ....................... | B60K 6/445 |
| | | | | 475/5 |
| 2014/0236441 A1* | 8/2014 | Sato | ....................... | B60W 20/00 |
| | | | | 903/902 |
| 2015/0072819 A1* | 3/2015 | Ono | .................... | B60W 10/115 |
| | | | | 475/5 |
| 2017/0197613 A1* | 7/2017 | Gv | .......................... | F16H 3/728 |
| 2018/0112746 A1* | 4/2018 | Byltiauw | ................ | F16H 47/06 |
| 2019/0084404 A1* | 3/2019 | Imai | ...................... | B60W 10/115 |
| 2019/0346036 A1* | 11/2019 | Ore | ........................ | B60K 6/08 |
| 2021/0140517 A1* | 5/2021 | Steinberger | ............ | B60K 6/52 |
| 2021/0146768 A1* | 5/2021 | Wiener | ............... | B60K 6/547 |
| 2021/0178889 A1* | 6/2021 | Singh | ..................... | B60K 6/445 |
| 2021/0178890 A1* | 6/2021 | Steinberger | ............ | B60K 6/387 |
| 2021/0188241 A1* | 6/2021 | Kikuchi | ................ | B60W 20/15 |
| 2021/0199179 A1* | 7/2021 | Xie | ........................ | B60K 6/387 |
| 2021/0291806 A1* | 9/2021 | Forte | ..................... | B60K 6/365 |

\* cited by examiner

510

Clutch Apply Chart

| Mode | Clutch 1 | Clutch 2 | Clutch 3 | Clutch 4 |
|---|---|---|---|---|
| Gear 1 | CLOSED | OPEN | OPEN | OPEN |
| Gear 2 | OPEN | CLOSED | OPEN | OPEN |
| Gear 3 | OPEN | OPEN | CLOSED | OPEN |
| Reverse | OPEN | OPEN | OPEN | CLOSED |
| Neutral | OPEN | OPEN | OPEN | OPEN |

Clutch Apply Chart

| Mode | Clutch 1 | Clutch 2 | Clutch 3 | Clutch 4 | HIGH/LOW clutch |
|---|---|---|---|---|---|
| Gear 1a | CLOSED | OPEN | OPEN | OPEN | LOW |
| Gear 1b | CLOSED | OPEN | OPEN | OPEN | HIGH |
| Gear 2a | OPEN | CLOSED | OPEN | OPEN | LOW |
| Gear 2b | OPEN | CLOSED | OPEN | OPEN | HIGH |
| Gear 3a | OPEN | OPEN | CLOSED | OPEN | LOW |
| Gear 3b | OPEN | OPEN | CLOSED | OPEN | HIGH |
| Rev-a | OPEN | OPEN | OPEN | CLOSED | LOW |
| Rev-b | OPEN | OPEN | OPEN | CLOSED | HIGH |
| Neutral | OPEN | OPEN | OPEN | OPEN | OPEN |

FIG. 5B

ELECTRIC CONTINUOUSLY VARIABLE
TRANSMISSION AND METHODS
THEREFOR

TECHNICAL FIELD

The present disclosure relates to an electric continuously variable transmission and methods for an electric continuously variable transmission.

BACKGROUND AND SUMMARY

A hydraulic continuously variable transmission (CVT) is a type of transmission that uses hydraulic components to vary a gear ratio continuously. Conventionally, a prime mover, such as an internal combustion engine, is drivingly coupled to an input gear of a hydraulic CVT via an output shaft. One advantage of such transmissions is increased power output by decoupling input speed and output speed. Another advantage is increased efficiency, as the engine may be operated at more efficient revolutions-per-minute (RPM). Such performance advantages are valuable in agricultural vehicles as well as other work vehicles and/or off-road vehicles. However, as is the case with hydraulic systems generally, hydraulic CVT systems may experience efficiency losses due to fluid friction and pumping losses. Additionally, such transmissions may be heavy and bulky due to the hydraulic fluid and hydraulic system components, further hampering efficiency.

Electric CVT systems may offer advantages over hydraulic CVT systems including increased efficiency, reduced weight, reduced package size, fewer moving parts that may demand less maintenance and capacity for integration in battery-hybrid systems. In particular, electric CVT systems offer increased control over the electric machine speed and torque output. However, an electric CVT configuration for a first setting may not be optimal for another setting. To provide another range of control, typically the transmission may be rebuilt to offer different gear ratios or, alternatively, the transmission build may be offered with more than one electric motor option from which a customer may select. In either case, the stakeholder may have to anticipate the needs of the customer and provide a line of transmissions that accommodate a range of applications.

The inventor has recognized the aforementioned challenges and developed systems and methods for an electric continuously variable transmission to address at least a portion of the challenges. In one example, an assembly is provided comprising a transmission at least partially enclosed in a housing. The transmission includes a planetary gear set coupled to a multispeed sub-transmission. The planetary gear set is configured to be coupled to a first electric machine and an internal combustion engine on a first side, and configured to be coupled to a second electric machine on a second side, where the first side and the second side are defined by a vertical plane that is perpendicular to a central axis of rotation of the planetary gear set. The first electric machine, the second electric machine, and the internal combustion engine are arranged outside of the housing. In this way, the electric machines are not integrated, but add-on, thereby allowing stakeholders to select off-the-shelf the electric machines suitable for the application.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 5A is a first table showing the clutch configurations for different operating gear modes.

FIG. 5B is a second table showing the clutch configurations for different operating gear modes.

DETAILED DESCRIPTION

An electric continuously variable transmission (CVT) is herein disclosed. The electric CVT is an input-split transmission gear train configured to be coupled to two electric machines with corresponding inverters, or a dual inverter. A first electric machine is couplable to a carrier of the planetary gear set and a second electric machine is couplable to a sun gear of the planetary gear set. An internal combustion engine directly connects via a transmission input shaft to a ring gear of the planetary gear set. The electric CVT is at least partially enclosed in a housing; however, the electric motors are not enclosed in the housing but add-on. As such, the electric machines may be selected off-the-shelf, thereby lowering costs and increasing flexibility for customers. Conversely, an electric CVT system having one or more integrated electric machines involves substantial custom design, which, for a lower production market such as agricultural applications, may increase costs significantly. In addition to increasing choice and accommodating a range of applications, the disclosed electric CVT may provide speed control, smooth acceleration, and efficient power delivery across varying load and terrain without manual shifting, advantages that are desirable in agricultural and off-road settings.

For agricultural vehicles, a power take-off (PTO) system is a desired feature. The disclosed PTO described herein is clutched, meaning that the PTO can either be connected or disconnected, for function and efficiency. The PTO is directly connected to the electric CVT input. CVT transmissions allow drivers to independently select the input (PTO) speed and the output speed (e.g., to a drive axle), therefore the production efficiency can be increased by calibrating an appropriate ratio between PTO implements and driving speed or driving power. Optionally a second gear set may be added to the PTO system, which may further reduce dependency on an engine speed and allow the engine to run at higher efficiency speeds.

Further, the electric CVT may be configured with a high/low gear set for shifting on the move or under load. The electric CVT may be configured as a hybrid-electric system with the addition of a battery to the DC bus of the electric machines (e.g., motors and inverters). As a hybrid-electric system, the disclosed electric CVT may further increase efficiency and performance of the transmission by recuperating energy via regenerative braking and by providing extra torque when demanded.

Figure 1:
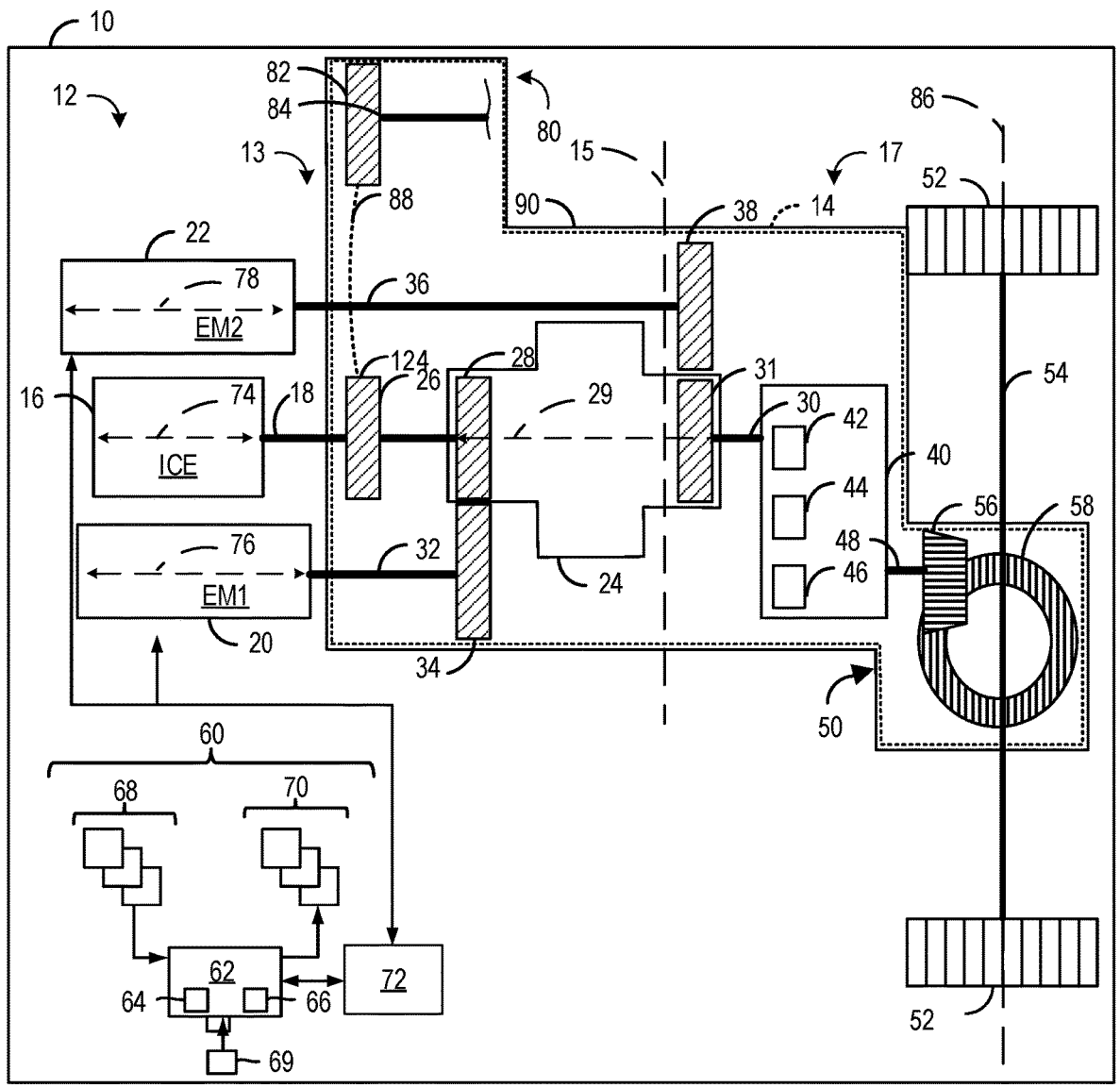
FIG. 1 is a vehicle provided with a first example of an electric continuously variable transmission.
Figure 2:
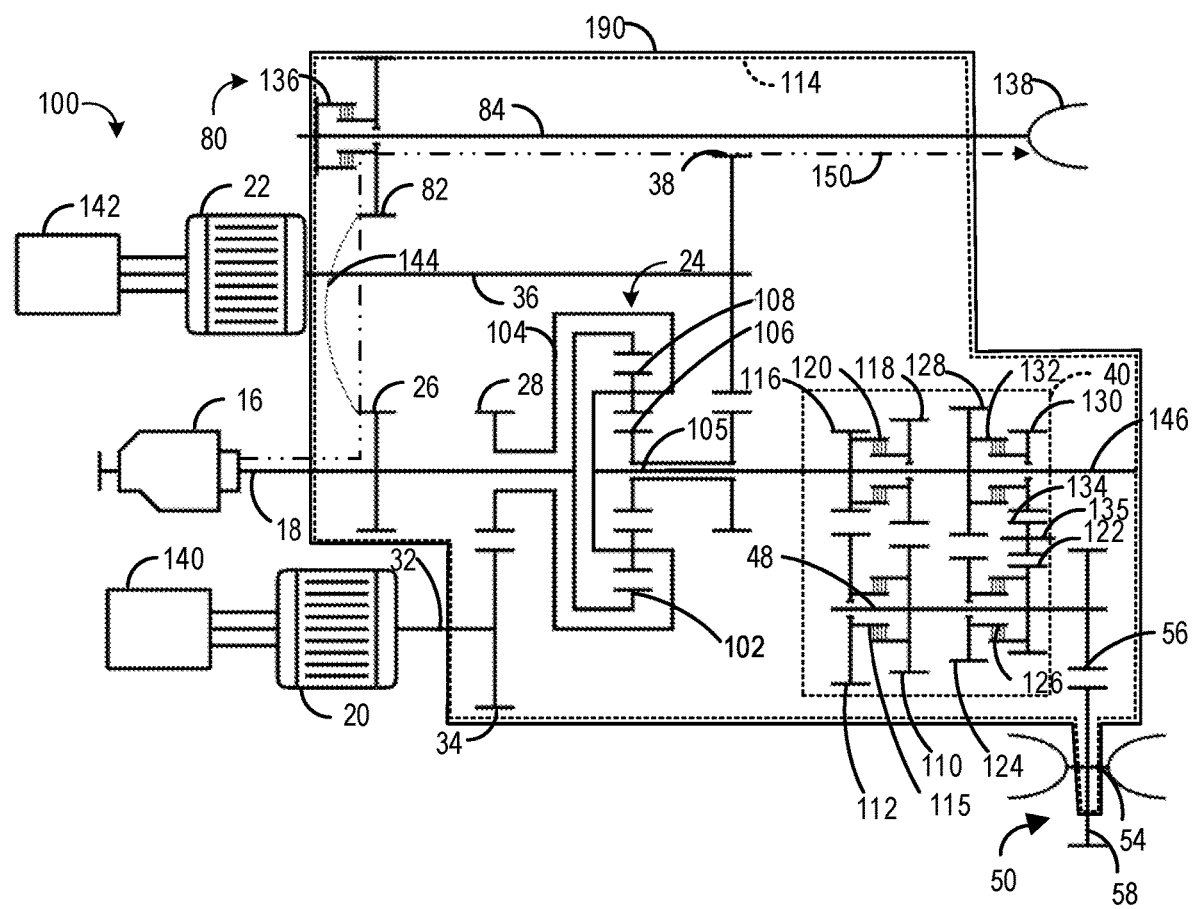
FIG. 2 is a second example of an electric continuously variable transmission.
Figure 3:
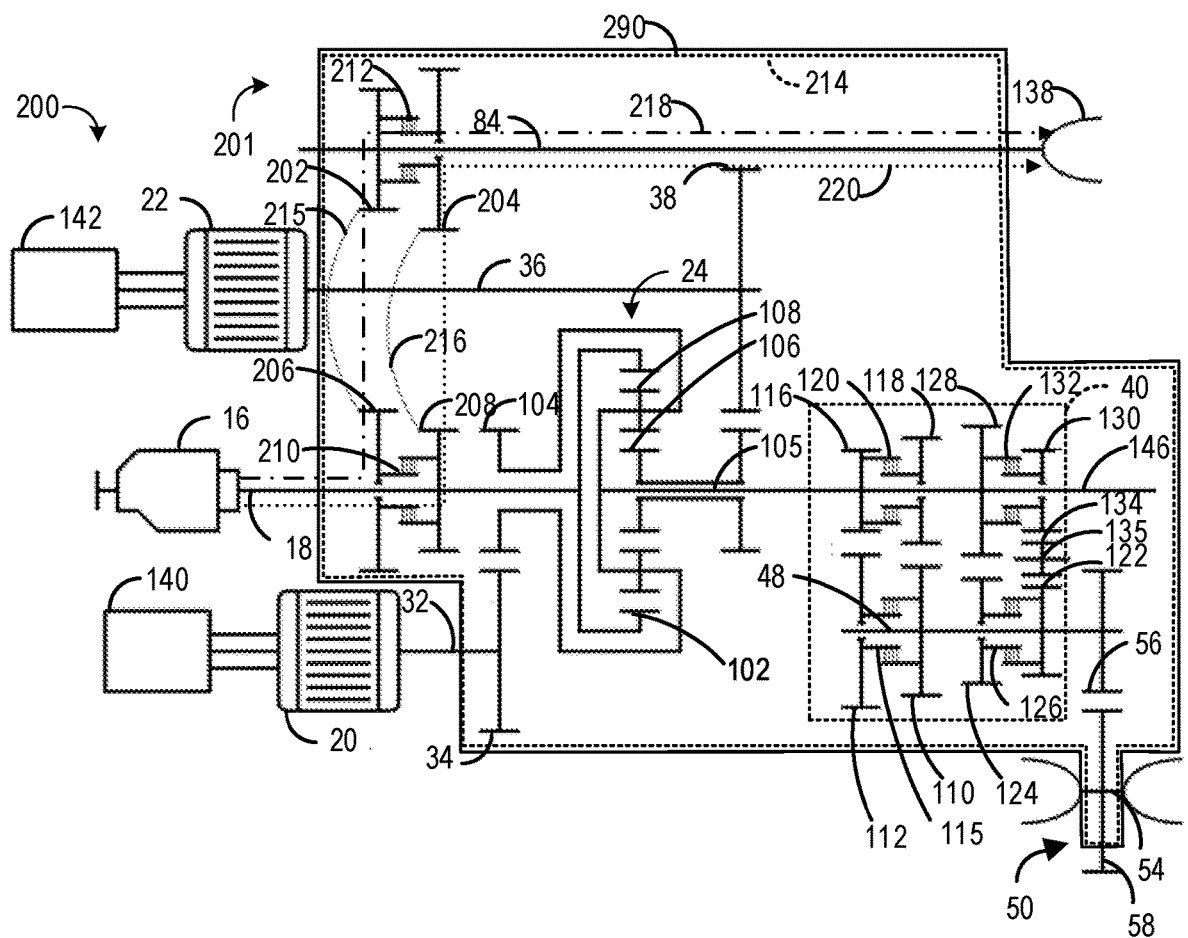
FIG. 3 is a third example of an electric continuously variable transmission.
Figure 4:
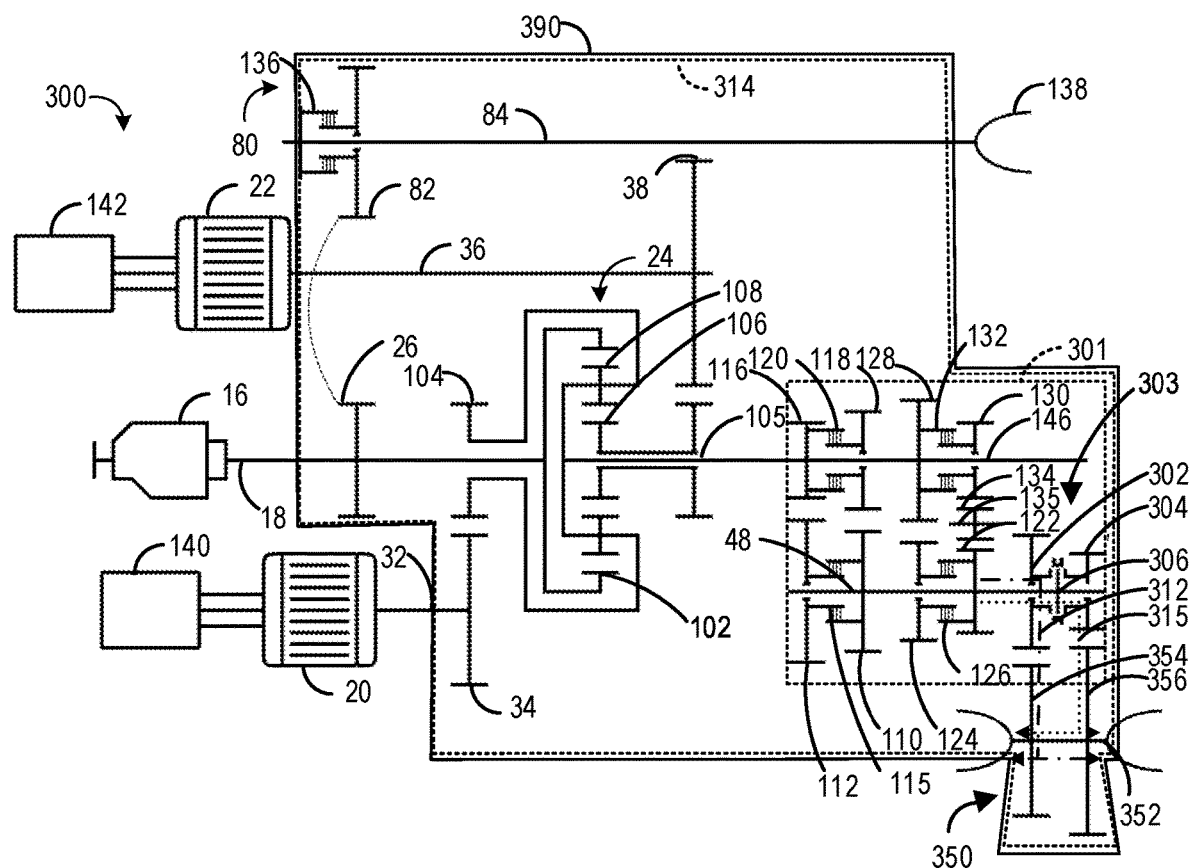
FIG. 4 is a fourth example of an electric continuously variable transmission.
Figure 6:
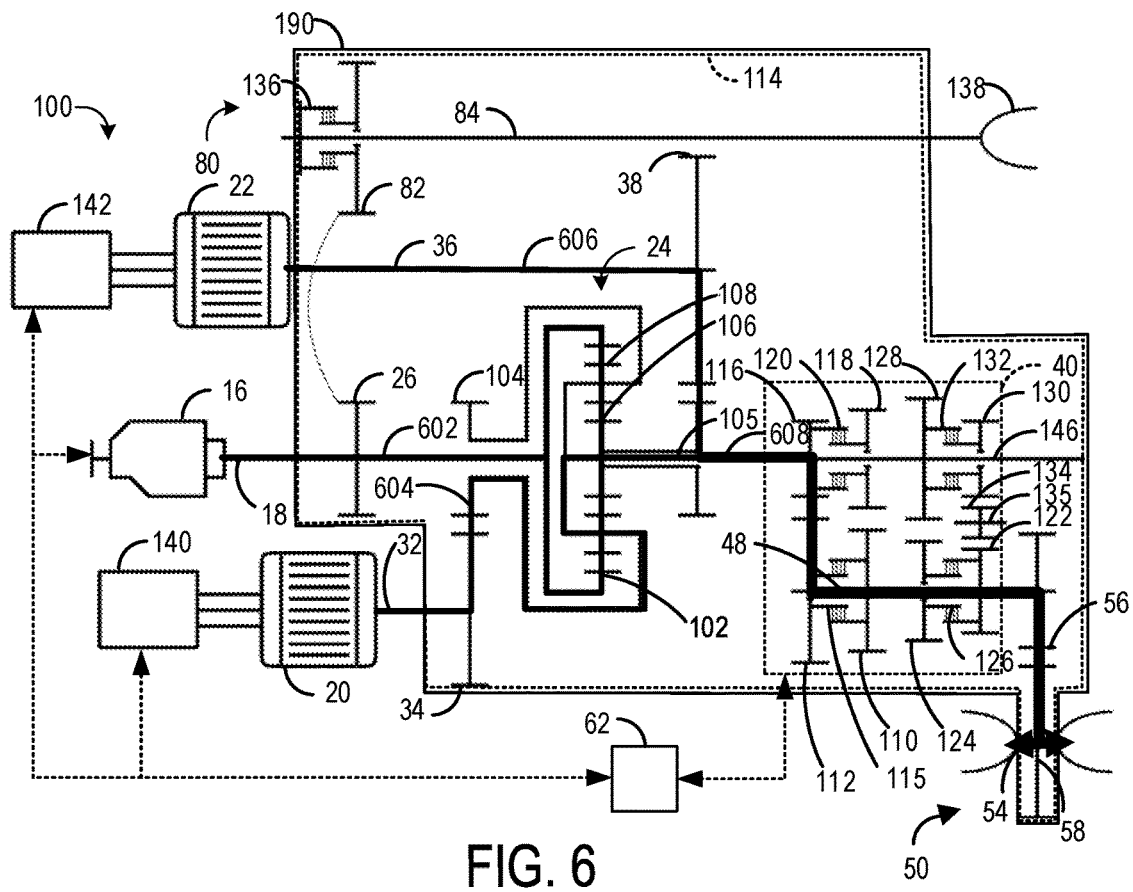
FIG. 6 shows power paths in a first operating mode through the example of a transmission depicted in FIG. 2.
Figure 7:
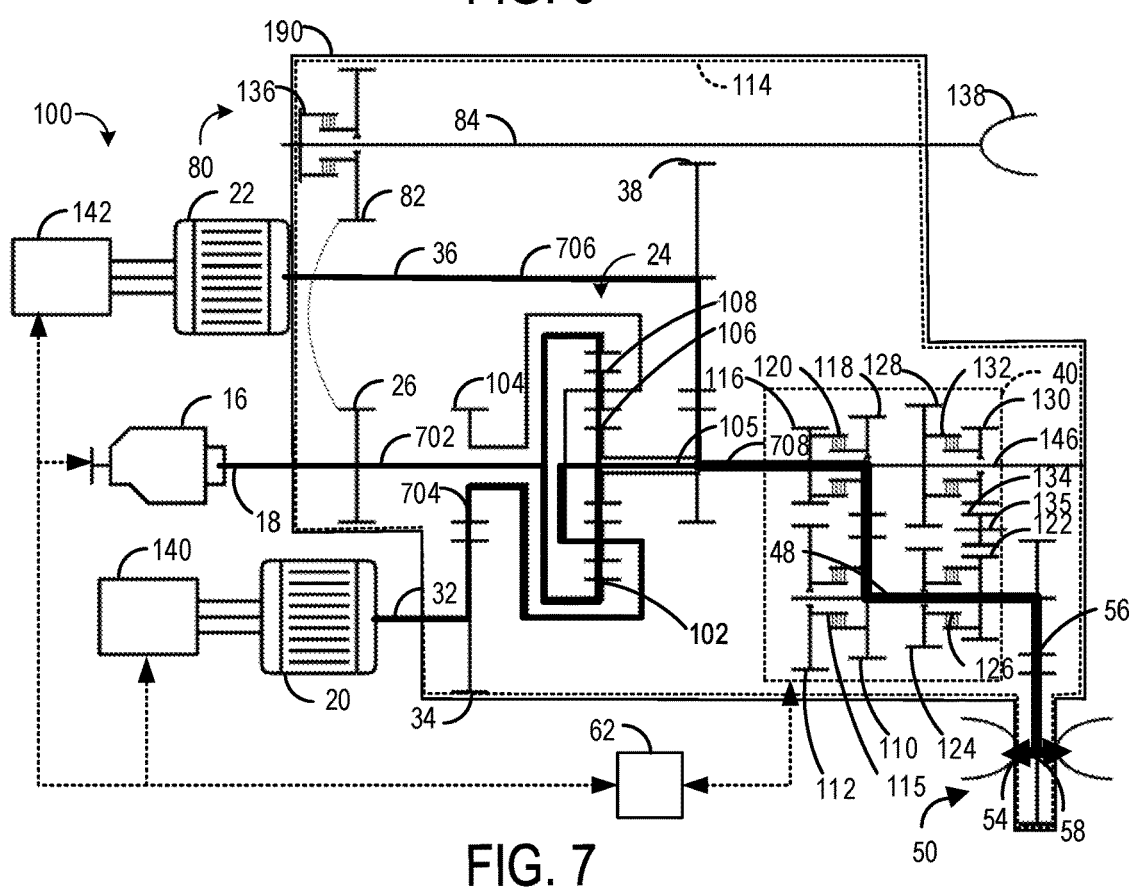
FIG. 7 shows power paths in a second operating mode through the example of a transmission depicted in FIG. 2.
Figure 8:
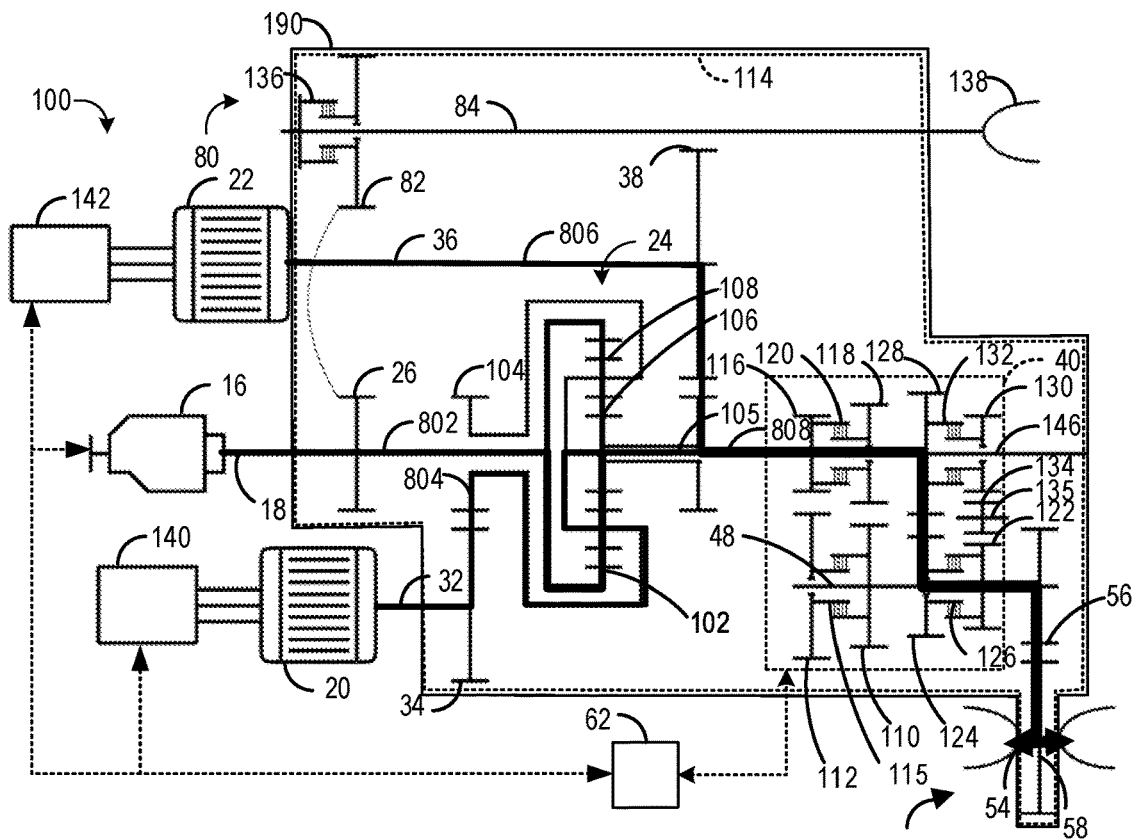
FIG. 8 shows power paths in a third operating mode through the example of a transmission depicted in FIG. 2.
Figure 9:
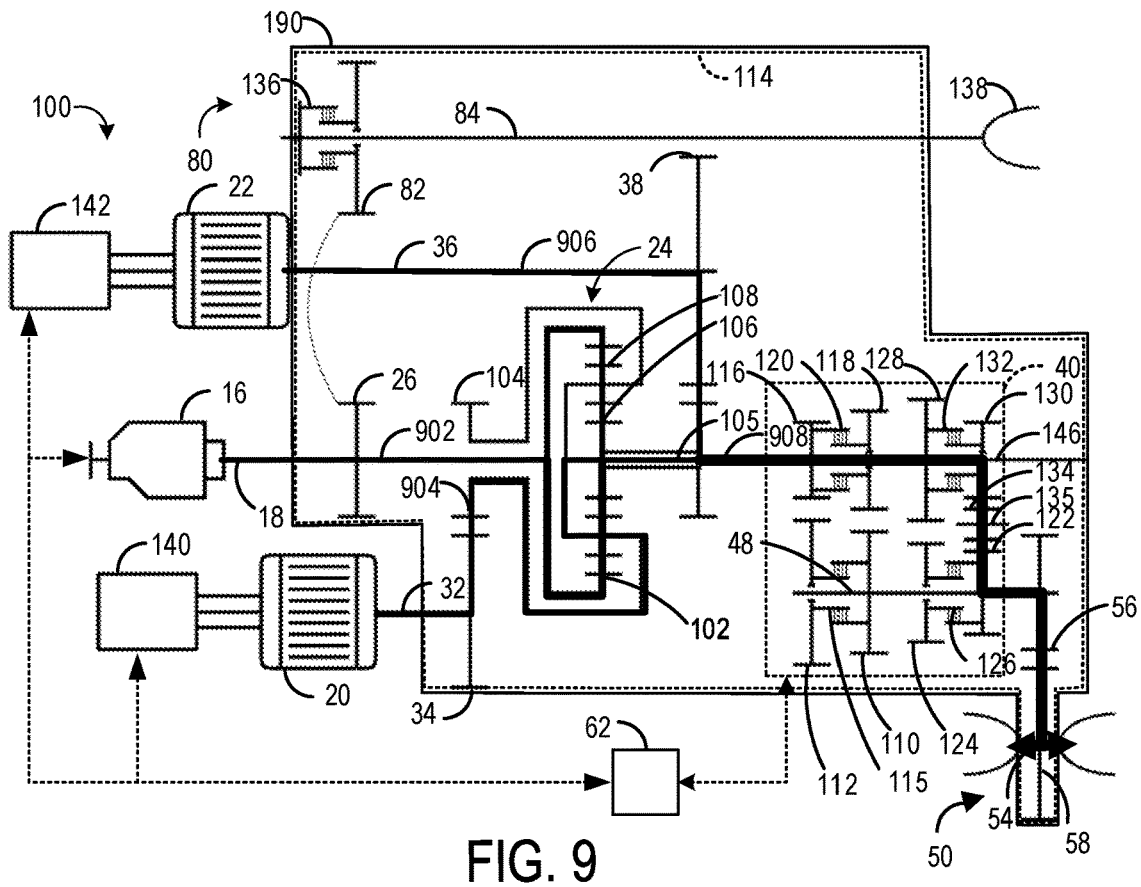
FIG. 9 shows power paths in a fourth operating mode through the example of a transmission depicted in FIG. 2.

A vehicle system that includes an electric CVT with a PTO is illustrated in FIG. 1. A second example of an electric CVT with a PTO is illustrated in FIG. 2. A third example of an electric CVT with an alternative PTO is illustrated in FIG. 3. A fourth example of an electric CVT having an additional high/low gear arrangement is illustrated in FIG. 4. A first table depicting gears that may be obtained by applying a clutch of the exemplary transmissions described herein is illustrated in FIG. 5A. FIG. 5B is a second table showing gears that may be obtained by applying a clutch of the exemplary transmissions described herein. FIG. 6 shows a first power path through the exemplary transmission of FIG. 2. FIG. 7 shows a second power path through the exemplary transmission of FIG. 2. FIG. 8 shows a third power path through the exemplary transmission of FIG. 2. FIG. 9 shows a reverse power path (e.g., a fourth power path) through the exemplary transmission of FIG. 2.

FIG. 1 schematically depicts a vehicle system 10 with an electric continuously variable transmission system (e-CVT) 12 including a transmission 14 with a first power take-off (PTO) system 80. The transmission 14 comprises a planetary gear set 24 coupled to a multispeed sub-transmission 40. The planetary gear set 24 is configured to be coupled to an internal combustion engine (ICE) 16 and a first electric machine 20 on a first side 13. The planetary gear set 24 is configured to be coupled to a second electric machine 22 on a second side 17. The first side 13 and the second side 17 may be defined by a vertical plane 15 that is perpendicular to a central axis of rotation 29 of the planetary gear set 24. For example, the multi-speed sub-transmission 40 couples to the planetary gear set 24 on the second side 17. The transmission 14 may be enclosed by a housing 90, whereas the ICE 16, the first electric machine 20, and the second electric machine 22 may not be integrated in the housing 90. In other words, the ICE 16, the first electric machine 20, and the second electric machine 22 may be arranged outside of the housing 90. The exemplary transmissions described herein may be used in industrial machines or in other systems where a gear change is desired.

The ICE 16 is drivingly engaged with transmission 14 via a transmission input shaft 18. In one example, the transmission input shaft 18 may be a first transmission input shaft. The first electric machine 20 may be coupled the transmission 14 via a first electric machine (EM1) transmission input shaft 32. In one example, the EM1 transmission input shaft 32 may be a second transmission input shaft. The second electric machine 22 may be coupled to the transmission 14 via a second electric machine (EM2) transmission input shaft 36. In one example, the EM2 transmission input shaft 36 may be a third transmission input shaft. The first electric machine 20 and the second electric machine 22 may include conventional components such as a stator, rotor, rotor shaft, and the like to enable the electric motor to generate mechanical power and electrical energy, when the motor is designed for regeneration. The first electric machine 20 and the second electric machine 22 may be selected for the transmission 14 based on the intended application of the stakeholder and/or customer needs (e.g., size, speed, power, load, etc.). The ICE 16 may rotate about a rotational axis 74. The first electric machine 20 may rotate about a rotational axis 76. The second electric machine may rotate about a rotational axis 78. In some examples, the first electric machine 20 and the second electric machine 22 may receive electrical power from a power supply, such as a battery 72, to provide torque to the transmission 14 and to the mechanical components coupled thereto such as wheels 52. In some examples, the first electric machine 20 and the second electric machine 22 may provide electrical power to the battery 72 via regenerative processes, such as during breaking, or as a generator. By adding battery 72 to the DC bus of the first electric machine 20 and the second electric machine 22, transmission 14 may be a hybrid transmission, further improving the efficiency and the performance of the vehicles, by recuperating energy to the battery pack when possible, but also by providing extra torque when needed.

The planetary gear set 24 is drivingly engaged with the ICE 16 via the transmission input shaft 18. The planetary gear set 24 may include a planetary carrier gear 28 fixedly rotationally coupled to the transmission input shaft 18. In one example, the planetary carrier gear 28 may be a mounted on a carrier of the planetary gear set 24 (e.g., see FIGS. 2-4). The planetary gear set 24 may include a gear 31 fixedly rotationally coupled to a planetary output shaft 30. In one example, the gear 31 may comprise a sun gear and the planetary output shaft 30 may comprise a carrier output shaft of the planetary gear set 24 (e.g., see FIGS. 2-4). The gears described herein each include a plurality of teeth that are profiled to mate with adjacent gears. The types of gears arranged on the transmission shafts may specifically be helical gears and/or spur gears. Further, meshed pairs of gears may be designed with similar gear types. The multispeed sub-transmission 40 may include a plurality of clutches 42 for selectively controlling a plurality of gears to realize a plurality of operating modes (e.g., see FIGS. 2-5B). For example, the multispeed sub-transmission may include at least two clutch for realizing at least two speed ratios. The first speed ratio may include an operating range with a forward and a reverse direction.

The transmission 14 may be an input-split transmission gear train (also called an output-coupled transmission gear train). As an input-split design, one electric machine may connect to the output side of the planetary gear set 24 and one electric machine may connect to a third member, such as a sun gear, of the planetary gear set 24. For example, a first electric machine (EM1) transmission input gear 34 may fixedly rotationally couple to the EM1 transmission input shaft 32. The EM1 transmission input gear 34 may mesh with the planetary carrier gear 28. A second electric machine (EM2) transmission input gear 38 may fixedly rotationally couple to the EM2 transmission input shaft 36. The EM2 transmission input gear 38 may mesh with the gear 31. The gear 31 may couple to the multispeed sub-transmission 40 via the planetary output shaft 30. It will be appreciated that the EM1 transmission input shaft 32 and the EM2 transmission input shaft 36 receive mechanical power from the upstream components. However, during regeneration operation on or both shafts may transfer mechanical power to the upstream components. Note that without a battery, the first electric machine may deliver the same amount of power as the second electric machine absorbs (or vice versa). With a battery, both motors can deliver or absorb together.

A differential system 50 may comprise a gear 56 that meshes with a gear 58. In one example, the gear 56 may be a pinion gear and the gear 58 may be a ring gear. A second shaft 48 may rotationally couple to the gear 58, or other suitable downstream component, via the gear 56. Alternatively, the gear 58 may couple to a driveline or may be another suitable type of mechanical interface. The gear 56 may specifically be a bevel gear, in one example. However, varieties of suitable output gears have been contemplated (e.g., helical, spur). The gear 58 may engage with the wheels 52 via an axle shaft 54, which in some examples may comprise a first axle half shaft and a second axle half shaft. The wheels 52 and the axle shaft 54 may rotate about a rotational axis 86.

The transmission input shaft 18 may have an input-coupled gear 26 mounted thereon. A PTO shaft 84 may have a PTO gear 82 mounted thereon. The PTO gear 82 may mesh with the input-coupled gear 26, as indicated by dotted lines 88. In this way, the ICE 16 may drive the first PTO system 80. Further, the CVTfirst PTO system 80 may include at least a first PTO clutch that enables the ICE 16 to selectively drive the PTO shaft 84 and an implement coupled thereto (e.g., see FIGS. 2-4 for exemplary PTO clutches). The CVT system, as disclosed herein, allows the driver to select the input (PTO) speed and the output speed independent of each other, which allows for selecting an appropriate ratio between implements and driving speeds, or in other words, by optimizing distribution between implements and driving power.

As shown in FIG. 1, the vehicle system 10 may further include a control system 60 with a controller 62. The controller 62 may include a microcomputer with components such as a processor 64 (e.g., a microprocessor unit), input/output ports, an electronic storage medium 66 for executable programs and calibration values, e.g., a read-only memory chip, random access memory, keep alive memory, a data bus, and the like. The storage medium may be programmed with computer readable data representing instructions executable by a processor for performing the methods, control techniques, and the like described herein as well as other variants that are anticipated but not specifically listed. Therefore, the electronic storage medium 66 may hold instructions stored therein that when executed by the processor 64 cause the controller 62 to perform the various method steps described herein.

The controller 62 may receive various signals from sensors 68 coupled to different regions of the vehicle system 10 and specifically the transmission 14. For example, the sensors 68 may include motor speed sensors, shaft/gear speed sensors, speed sensors at the vehicle wheels, and the like. An input device 69 (e.g., accelerator pedal, brake pedal, gear selector, combinations thereof, and the like) may further provide input signals indicative of the intent of an operator for vehicle control.

Upon receiving the signals from the various sensors 68 of FIG. 1, the controller 62 processes the received signals, and employs various actuators 70 of system components to adjust the components based on the received signals and instructions stored on the memory of controller 62. For example, the controller 62 may receive an accelerator pedal signal indicative of an operator request for a vehicle acceleration adjustment. In response, the controller 62 may command operation of one or more of the first electric machine 20, the second electric machine 22, and the ICE 16 to increase the power delivered to the transmission 14. The controller 62 may, during certain operating conditions, be designed to send commands to the plurality of clutches 42 of the transmission 14 (e.g., see FIGS. 2-4) that in response use a plurality of clutch actuators 44 to engage or disengage selected gears. The other controllable components in the vehicle may function in a similar manner with regard to sensor signals, control commands, and actuator adjustment, for example.

For example, the controller 62 may receive a signal from the input device 69 indicative of an operator request for a vehicle acceleration adjustment. In response, the controller 62 may command operation of one or both of the first electric machine 20 and the second electric machine 22 to increase the power delivered to the axle shaft 54. The controller 62 may, during certain operating conditions, be designed to send commands to the plurality of clutches 42 and in response use clutch actuators 44 to engage or disengage selected gears. For example, the control system may have instructions stored on the memory of the controller 62 that when executed cause the controller to select a mode of operation, such as an operating gear, and based on the mode of operation selected, instructions may include the controller adjusting one or more of the plurality of clutches 42 of the multispeed sub-transmission 40. The controller 62 may detect clutch position from signals sent via a plurality of clutch position sensors 46. The other controllable components in the vehicle system 10 may function in a similar manner with regard to sensor signals, control commands, and actuator adjustment, for example. As another example, instructions may include the controller 62 automatically adjusting one or more of the plurality of clutch actuators 44 based on signals from one or more traction sensors for monitoring wheel traction.

FIG. 2 shows a second example of an electric continuously variable transmission (e-CVT) 100 that may be included in a vehicle system, such as the vehicle system 10 depicted in FIG. 1. The second e-CVT 100 may comprise a second transmission 114, which may be an example of the transmission 14 shown in FIG. 1, the first electric machine 20, and the second electric machine 22 coupled to the second transmission 114, and the ICE 16. Components previously introduced are similarly numbered in this figure and subsequent figures. For example, the second e-CVT 100 may include the first PTO system 80 drivingly coupled to the ICE 16.

A housing 190 may house the planetary gear set 24, the multispeed sub-transmission 40, the input-coupled gear 26, the EM1 transmission input gear 34, the EM2 transmission input gear 38, the gear 56, and components of the first PTO system 80 including a PTO clutch 136, the PTO gear 82, and the PTO shaft 84. The housing 190 may house portions of the transmission input shaft 18, the EM1 transmission input shaft 32, the EM2 transmission input shaft 36, a carrier output shaft 105, and the second shaft 48. The first electric machine 20, the second electric machine 22, and the ICE 16 may be external to the housing 190.

The planetary gear set 24 comprises a sun gear 106, a carrier 104, ring gear 102, and a plurality of planet gears 108. In the example, the transmission input shaft 18 and the ICE 16 coupled thereto directly connects to the ring gear 102. The first electric machine 20 connects to the carrier 104 via the EM1 transmission input gear 34 in meshed engagement with the planetary carrier gear 28. The second electric machine 22 connects to the sun gear 106 via the EM2 transmission input gear 38. In one example, the sun gear 106 may be an example of the gear 31 described with reference to in FIG. 1. The carrier 104 connects to the multispeed sub-transmission 40 via the carrier output shaft 105. The carrier output shaft 105 may be an example of the planetary output shaft 30 described with reference to FIG. 1. In one example, the various gears illustrated in FIG. 2 may include teeth that mesh (e.g., interlock) with other gears drawn coupled thereto.

In one example, the disclosed transmission includes a three-speed subassembly or sub-transmission comprising a first shaft directly connected to a carrier output shaft, a second shaft, and at least a first clutch and a second clutch to realize at least a first forward speed and a second forward speed, and at least first reverse clutch with an idler gear to realize at least one reverse speed. For example, the multi-speed sub-transmission 40 comprises a first shaft 146 directly connected to the carrier output shaft 105, the second shaft 48, a first clutch 115, a second clutch 120, a third clutch 126, and a reverse clutch 132 with an idler gear 134 mounted on an idler shaft 135. The first clutch 115, the second clutch 120, and a third clutch 126 may be operated to realize three forward speeds, and the reverse clutch 132 may be operated to realize one reverse speed. The first clutch 115 and the reverse clutch 132 may be coupled to the second shaft 48 and selectively operate gears mounted thereon. The second clutch 120 and the reverse clutch 132 may be coupled to the first shaft 146 and selectively operate gears mounted thereon. In one example, the first shaft 146 may be continuous with the carrier output shaft 105.

The first shaft 146 is arranged in parallel with the second shaft 48. The idler shaft 135 is interposed between the first shaft 146 and the second shaft 48. One or more gears of the multispeed sub-transmission 40 may mesh with a gear arranged on an opposing shaft. For example, a first gear 112 that is selectively rotationally coupled to the second shaft 48 by operation of the first clutch 115 meshes with a second fixed gear 116 that is fixedly rotationally coupled to the first shaft 146. A second gear 118 that is selectively rotationally coupled to the first shaft 146 by operation of the second clutch 120 meshes with a first fixed gear 110 that is fixedly rotationally coupled to the first shaft 146. A third gear 124 that is selectively rotationally coupled to the second shaft 48 by operation of the third clutch 126 meshes with a reverse fixed gear 128 that is fixedly rotationally coupled to the first shaft 146. A reverse gear 130 that is selectively rotationally coupled to the first shaft 146 by operation of the reverse clutch 132 meshes with the idler gear 134 that is fixedly rotationally coupled to the idler shaft 135. The idler gear 134 meshes with a third fixed gear 122 that is fixedly rotationally coupled to the second shaft 48. The fixed gears may be fixed to the respective to the first shaft 146 or the second shaft 48 using splines, a press fit, a keyway, a bolt, a weld, integrated directly to the first shaft 146 or the second shaft 48, or other similar methods.

In one example, the clutches are automatically operated one-at-a-time. For example, closing the first clutch 115 and opening the second clutch 120, the third clutch 126, and the reverse clutch 132 may engage the first gear 112 to realize a first operating mode or speed. Closing the second clutch 120 and opening the first clutch 115, the third clutch 126, and the reverse clutch 132 may engage the second gear 118 to realize a second operating mode. Closing the third clutch 126 and opening the first clutch 115, the second clutch 120, and the reverse clutch 132 may engage the third gear 124 to realize a third operating mode. Closing the reverse clutch 132 and opening the first clutch 115, the second clutch 120, and the third clutch 126 may engage the reverse gear 130 to realize a reverse operating mode. To accomplish this functionality, the clutches may be wet clutches. The clutches may have a similar design, in one example, to simplify manufacturing and repair. However, in other examples, clutches may be a combination of different designs. Further, the clutches may be, but are not limited to, hydraulically, pneumatically, and/or electro-mechanically actuated, in one example, or a combination.

In operation, the planetary output shaft 30 transmits torque to the first shaft 146. The first shaft 146 transmits torque to the second shaft 48 via one of the second fixed gear 116, the second gear 118, the reverse fixed gear 128, and the reverse gear 130 to the opposing gear arranged on the second shaft 48. For example, the torque may be transmitted from one of the gears arranged on the first shaft 146 via meshing with one of the first gear 112, the first fixed gear 110, the third gear 124, and the third fixed gear 122 arranged on the second shaft 48. The torque may then transmit to the axle shaft 54 from the second shaft 48 via gear 56 in meshed engagement with gear 58. Exemplary operating modes for an electric continuously variable transmission, such as the second e-CVT 100, including clutch engagement and corresponding gears are described in detail with reference to FIG. 5A.

A first inverter 140 alters the power supply from the battery (e.g., battery 72) to/from the first electric machine 20 and a second inverter 142 alters the power supply to/from the battery the second electric machine 22. In one example, the first inverter 140 and the second inverter 142 may be in electronic communication with a controller of a control system, such as the controller 62 in control system 60 described with reference to FIG. 1. The controller may adjust power to the inverters to control the output speed of the electric machines, and in this way, achieve a seamless and continuous variation of the output speed, e.g., to the wheels 52 in FIG. 1.

The first PTO system 80 comprises the PTO shaft 84, the PTO gear 82 selectively rotationally coupled to the PTO shaft 84, the PTO clutch 136, and a PTO output 138. The PTO gear 82 meshes with the input-coupled gear 26, as indicated by dotted lines 144. Engaging the PTO clutch 136 fixedly rotationally couples the PTO gear 82 to the PTO shaft 84, thereby transmitting torque along a power path 150 from the ICE 16 to the PTO shaft 84, from the PTO shaft 84 to the PTO output 138 and an implement drivingly mounted thereon. With the PTO clutch 136 disengaged, the PTO gear 82 rotates in meshed engagement with the ICE 16 without transmitting torque to the PTO shaft 84. In one example, the PTO clutch 136 is a wet clutch.

FIG. 3 shows a third example of an electric continuously variable transmission (e-CVT) 200 that may be included in a vehicle system, such as included in the vehicle system 10 depicted in FIG. 1. The third e-CVT 200 may comprise a third transmission 214, which may be an example of the transmission 14 shown in FIG. 1, the first electric machine 20, and the second electric machine 22 coupled to the third transmission 214, and the ICE 16. The third transmission 214 may be enclosed in a housing 290.

The third e-CVT 200 includes an example of a second PTO system 201 according to the present disclosure. Similar to the first PTO system 80, the second PTO system 201 includes the PTO shaft 84 meshed with the transmission input shaft 18 and selectively engaged, via at least one PTO clutch, with the transmission input shaft 18. In addition, the second PTO system 201 is configured with a second gear, which may further reduce dependency on the engine speed and allow the ICE 16 to run at higher efficiency speeds.

The second PTO system 201 comprises the PTO shaft 84, a first PTO gear 202 fixedly rotationally coupled to the PTO shaft 84, a second PTO clutch 212, and a second PTO gear 204 selectively fixedly rotationally coupled to the PTO shaft 84. The second PTO system 201 further comprises a first input-coupled gear 206 selectively fixedly rotationally coupled to the transmission input shaft 18 and a second input-coupled gear 208 fixedly rotationally coupled to the transmission input shaft 18. The first PTO gear 202 meshes with the first input-coupled gear 206, as indicated by dotted lines 215. The second PTO gear 204 meshes with the second input-coupled gear 208, as indicated by dotted lines 216. Engaging the first PTO clutch 210 while disengaging the second PTO clutch 212 fixedly rotationally couples the first input-coupled gear 206 to the transmission input shaft 18, thereby transmitting torque along a first power path 218 from the ICE 16 to the PTO shaft 84, from the PTO shaft 84 to the PTO output 138 and an implement drivingly mounted thereon. Engaging the second PTO clutch 212 while disengaging the first PTO clutch 210 fixedly rotationally couples the second PTO gear 204 to the PTO shaft 84, thereby transmitting torque along a second power path 220 from the ICE 16 to the PTO shaft 84, from the PTO shaft 84 to the PTO output 138 and an implement drivingly mounted thereon. In one example, the first PTO clutch 210 and the second PTO clutch 212 are wet clutches.

FIG. 4 shows a fourth example of an electric continuously variable transmission (c-CVT) 300 that may be included in a vehicle system, such as included in the vehicle system 10 depicted in FIG. 1. The fourth e-CVT 300 may comprise a fourth transmission 314, which may be an example of the transmission 14 shown in FIG. 1, the first electric machine 20, and the second electric machine 22 coupled to the fourth transmission 314, and the ICE 16. The fourth transmission 314 may be enclosed in a housing 390.

The fourth e-CVT 300 includes a high/low gear set 303 that may be optionally be added to a multispeed sub-transmission 301 according to the present disclosure. The multispeed sub-transmission 301 may be otherwise configured the same or similar as the multispeed sub-transmission 40 described with reference to FIGS. 2-3. In the example, the high/low gear set 303 is included in a configuration where the PTO system includes one PTO clutch. However, it may be understood that the high/low gear set 303 may be included in examples of the disclosed e-CVT where the PTO system is configured with two PTO clutches, such as described with reference to FIG. 3. In some examples, including a high/low gear set in the disclosed e-CVT may enable shifting while on the move or under load. In this way, a vehicle operator may experience smooth acceleration, deceleration, and gear changes with less wear on mechanical components.

The high/low gear set 303 comprises the second shaft 48, a low gear 302 selectively fixedly rotationally coupled to the second shaft 48, a high gear 304 selectively fixedly rotationally coupled to the second shaft 48, and a high/low clutch 306. The high/low gear set 303 selectively transmits torque from the fourth transmission 314 to mechanical components coupled thereto, such as wheels 52, via a second differential system 350. The second differential system 350 may comprise an axle shaft 352, and a first gear 354 and a second gear 356 fixedly rotationally coupled to the axle shaft 352. The first gear 354 may mesh with the low gear 302 and the second gear 356 may mesh with the high gear 304.

In one example, the high/low clutch 306 may be operated to selectively fixedly rotationally couple one of the low gear 302 and the high gear 304 to the second shaft 48. For example, with the low gear 302 fixedly rotationally coupled to the second shaft 48, torque travels a low gear power path 312 from the second shaft 48 to the axle shaft 352 via the low gear 302 in meshed engagement with the first gear 354. With the high gear 304 fixedly rotationally coupled to the second shaft 48, torque travels a high gear power path 315 from the second shaft 48 to the axle shaft 352 via the high gear 304 in meshed engagement with the second gear 356. In one example, the high/low clutch 306 is dog clutch. In other examples, the high/low clutch 306 may be a wet or dry clutch.

In the example given in FIG. 4, the multispeed sub-transmission 301 is as a multi-speed subassembly comprising the first clutch 115, the second clutch 120, the third clutch 126, the reverse clutch 132, and the high/low clutch 306. However, in other examples, the disclosed transmission may be configured with two clutches to realize two forward speeds and at least one clutch with an idler gear to realize at least one reverse speed. As an alternative example, the multispeed sub-transmission 301 shown in FIG. 4 may be modified by omitting the first clutch 115, the first gear 112, the first fixed gear 110, the second clutch 120, the second gear 118, and the second fixed gear 116. Configured in this way, two forward speeds may be realized by engaging the third clutch 126 to fixedly rotationally couple the third gear 124 to the second shaft 48 and, at the same time, operating the high/low clutch 306 to couple one of the low gear 302 and the high gear 304 to the second shaft 48. Similarly, two reverse speeds may be realized by engaging the reverse clutch 132 to fixedly rotationally couple the reverse gear 130 to the first shaft 146, and, at the same time, operating the high/low clutch 306 to couple one of the low gear 302 and the high gear 304 to the second shaft 48. In this way, the disclosed e-CVT may suit a variety of applications.

FIG. 5A and FIG. 5B are a first table 510 and a second table 520, respectively, illustrating exemplary operating modes that may be realized by clutching at least one of the plurality of clutches that may be included in an example of the disclosed electric CVT system. For example, the first table 510 depicts operating modes that may be obtained by applying a clutch of the exemplary transmissions of FIGS. 1-3. The second table 520 depicts operating modes that may be obtained by applying one or more clutches of the exemplary transmissions of FIGS. 1 and 4. The operating modes represent the different discrete operating gears that have corresponding gear ratios. The transmission shifts between the gear ratios through operation of the first clutch 115, the second clutch 120, the third clutch 126, or the reverse clutch 132. When a gear mesh is active, a power path travels through said gear mesh. Further, with reference to the second table, the transmission shifts through gear ratios through operation of the high/low clutch 306.

The different modes may produce four distinct gear ratios. The range of ratios as well as the step between the ratios in the different operating modes may be selected based on a variety of factors such as the expected operating speed range of the motor, the expected range of transmission loads, desired vehicle speed ranges, and the like. The specific sizing of the gears is a combination of selecting the desired gear ratios in each of the different operating modes and determining the gear geometry, such that both radially aligned gear meshes engage, and meet the gear design targets. In the aforementioned use-case example, the ratios in the second and third operating modes are relatively close in value.

Each column of the first table 510 and the second table 520 may show a clutch that may be engaged. Each row of the first table 510 and the second table 520 may show a method to engage a corresponding mode listed in the row. With reference to the second table 520, operating modes that use the high/low clutch may be used to provide increased speeds and increased tractive effort, respectively.

The first table 510 illustrates a position of a first clutch, a second clutch, a third clutch, and a fourth clutch or reverse clutch, such as the first clutch 115, second clutch 120, and third clutch 126, and the reverse clutch 132, respectively. When a clutch is labeled OPEN in first table 510, the clutch is disengaged and in an open position. When a clutch is labeled CLOSED in the first table 510, the clutch is engaged and in a closed position.

The second table 520 illustrates a position of a first clutch, a second clutch, a third clutch, and a fourth clutch or reverse clutch, such as the first clutch 115, second clutch 120, and third clutch 126, and the reverse clutch 132, respectively. The second table 520 additionally illustrates a position of a high/low clutch a first clutch, such as the high/low clutch 306. When a clutch is labeled OPEN in second table 520, the clutch is disengaged and in an open configuration. When a clutch is labeled CLOSED in the second table 520, the clutch is engaged and in a closed configuration.

Turning now to FIG. 5A, the modes of operation will be discussed herein with reference to vehicle system 10, the second e-CVT 100, and the third e-CVT 200 of FIGS. 1-3, respectively.

In one example, the gear 1 mode of operation includes actuating the first clutch 115 to couple the first gear 112 to the second shaft 48, while maintaining open or opening the second clutch 120, the third clutch 126, and the reverse clutch 132. In Gear 1, the power path travels from the transmission input shaft 18, and optionally, from one or both of the EM1 transmission input shaft 32 and the EM2 transmission input shaft 36, to the carrier output shaft 105. The power path travels from the carrier output shaft 105 to the first shaft 146, from the first shaft 146 to the second fixed gear 116, and from the second fixed gear 116 to the first gear 112. The power path travels from the first gear 112 to the second shaft 48. Subsequently, the power paths may travel through a differential, axle shafts, and to the drive wheels, e.g., differential system 50, axle shaft 54, wheels 52.

In one example, the gear 2 mode of operation includes actuating the second clutch 120 to couple the second gear 118 to the first shaft 146, while maintaining open or actuating open the first clutch 115, the third clutch 126, and the reverse clutch 132. In gear 2, the power path travels from the transmission input shaft 18, and optionally, from one or both of the EM1 transmission input shaft 32 and the EM2 transmission input shaft 36, to the carrier output shaft 105. The power path travels from the carrier output shaft 105 to the first shaft 146, from the first shaft 146 to the second gear 118, and from the second gear 118 to the first fixed gear 110. The power path travels from the first fixed gear 110 to the second shaft 48. Subsequently, the power paths may travel through a differential, axle shafts, and to the drive wheels, e.g., differential system 50, axle shaft 54, wheels 52.

In one example, the gear 3 mode of operation includes actuating the third clutch 126 to couple the third gear 124 to the second shaft 48, while maintaining open or actuating open the first clutch 115, the second clutch 120, and the reverse clutch 132. In gear 3, the power path travels from the transmission input shaft 18, and optionally, from one or both of the EM1 transmission input shaft 32 and the EM2 transmission input shaft 36, to the carrier output shaft 105. The power path travels from the carrier output shaft 105 to the first shaft 146, from the first shaft 146 to the reverse fixed gear 128, and from the reverse fixed gear 128 to the third gear 124. The power path travels from the third gear 124 to the second shaft 48. Subsequently, the power paths may travel through a differential, axle shafts, and to the drive wheels, e.g., differential system 50, axle shaft 54, wheels 52.

In one example, the reverse mode of operation (or fourth mode of operation) includes actuating the reverse clutch 132 to couple the reverse gear 130 to the first shaft 146, while maintaining open or actuating open the first clutch 115, the second clutch 120, and the third clutch 126. In gear 3, the power path travels from the transmission input shaft 18, and optionally, from one or both of the EM1 transmission input shaft 32 and the EM2 transmission input shaft 36, to the carrier output shaft 105. The power path travels from the carrier output shaft 105 to the first shaft 146, from the first shaft 146 to the reverse gear 130, and from the reverse gear 130 to the idler gear 134, from the idler gear 134 to the third fixed gear 122. The power path travels from the third fixed gear 122 to the second shaft 48. Subsequently, the power paths may travel through a differential, axle shafts, and to the drive wheels, e.g., differential system 50, axle shaft 54, wheels 52.

In one example, the neutral mode may have each of first clutch 115, the second clutch 120, the third clutch 126, and the reverse clutch 132 actuated open. With each of the clutches open, the first gear 112 and the third gear 124 rotate freely about the second shaft 48 and the second gear 118 and the reverse gear 130 rotate freely about the first shaft 146.

Turning now to FIG. 5B, the modes of operation will be discussed herein with reference to vehicle system 10 and the fourth e-CVT 300 of FIG. 1 and FIG. 4, respectively.

In one example, the gear 1a and gear 1b modes of operation includes actuating the first clutch 115 to couple the first gear 112 to the second shaft 48, while maintaining open or actuating open the second clutch 120, the third clutch 126, and the reverse clutch 132. To achieve the gear 1a mode of operation, the method further includes actuating the high/low clutch 306 to couple the low gear 302 to second shaft 48. To achieve the gear 1b mode of operation, the method further includes actuating the high/low clutch 306 to couple the high gear 304 to second shaft 48. In gear 1a and gear 1b, the power path travels from the transmission input shaft 18, and optionally, from one or both of the EM1 transmission input shaft 32 and the EM2 transmission input shaft 36, to the carrier output shaft 105 of FIGS. 1 and 4. The power path travels from the carrier output shaft 105 to the first shaft 146, from the first shaft 146 to the second fixed gear 116, and from the second fixed gear 116 to the first gear 112. The power path travels from the first gear 112 to the second shaft 48. In gear 1a, the power path travels from the low gear 302 to the first gear 354. In gear 1b, the power path travels from the high gear 304 to the second gear 356. Subsequently, the power paths may travel through axle shafts and to the drive wheels, e.g., axle shaft 54, wheels 52.

In one example, the gear 2a and gear 2b modes of operation includes actuating the second clutch 120 to couple the second gear 118 to the first shaft 146, while maintaining open or actuating open the first clutch 115, the third clutch 126, and the reverse clutch 132. To achieve the gear 2a mode of operation, the method further includes actuating the high/low clutch 306 to couple the low gear 302 to the second shaft 48. To achieve the gear 2b mode of operation, the method further includes actuating the high/low clutch 306 to couple the high gear 304 to the second shaft 48. In gear 2a and gear 2b, the power path travels from the transmission input shaft 18, and optionally, from one or both of the EM1 transmission input shaft 32 and the EM2 transmission input shaft 36, to the carrier output shaft 105. The power path travels from the carrier output shaft 105 to the first shaft 146, from the first shaft 146 to the second gear 118, and from the second gear 118 to the first fixed gear 110. The power path travels from the first fixed gear 110 to the second shaft 48.

In gear 2*a*, the power path travels from the low gear 302 to the first gear 354. In gear 2*b*, the power path travels from the high gear 304 to the second gear 356. Subsequently, the power paths may travel through axle shafts and to the drive wheels, e.g., axle shaft 352, wheels 52.

In one example, the gear 3*a* and gear 3*b* modes of operation includes actuating the third clutch 126 to couple the third gear 124 to the second shaft 48, while maintaining open or actuating open the first clutch 115, the second clutch 120, and the reverse clutch 132. To achieve the gear 3*a* mode of operation, the method further includes actuating the high/low clutch 306 to couple the low gear 302 to second shaft 48. To achieve the gear 3*b* mode of operation, the method further includes actuating the high/low clutch 306 to couple the high gear 304 to second shaft 48. In gear 3*a* and gear 3*b*, the power path travels from the transmission input shaft 18, and optionally, from one or both of the EM1 transmission input shaft 32 and the EM2 transmission input shaft 36, to the carrier output shaft 105. The power path travels from the carrier output shaft 105 to the first shaft 146, from the first shaft 146 to the reverse fixed gear 128, and from the reverse fixed gear 128 to the third gear 124. The power path travels from the third gear 124 to the second shaft 48. In gear 3*a* the power path travels from the low gear 302 to the first gear 354. In gear 3*b*, the power path travels from the high gear 304 to the second gear 356. Subsequently, the power paths may travel through axle shafts and to the drive wheels, e.g., axle shaft 54, wheels 52.

In one example, the gear reverse-a and gear reverse-b modes of operation include actuating the reverse clutch 132 to couple the reverse gear 130 to the first shaft 146, while maintaining open or actuating open the first clutch 115, the second clutch 120, and the third clutch 126. To achieve the gear reverse-a mode of operation, the method further includes actuating the high/low clutch 306 to couple the low gear 302 to second shaft 48. To achieve the gear reverse-b mode of operation, the method further includes actuating the high/low clutch 306 to couple the high gear 304 to second shaft 48. In reverse-a and reverse-b gear, the power path travels from the transmission input shaft 18, and optionally, from one or both of the EM1 transmission input shaft 32 and the EM2 transmission input shaft 36, to the carrier output shaft 105. The power path travels from the carrier output shaft 105 to the first shaft 146, from the first shaft 146 to the reverse gear 130, and from the reverse gear 130 to the idler gear 134, from the idler gear 134 to the third fixed gear 122. The power path travels from the third fixed gear 122 to the second shaft 48. In reverse-a gear, the power path travels from the low gear 302 to the first gear 354. In reverse-b gear, the power path travels from the high gear 304 to the second gear 356. Subsequently, the power paths may travel through axle shafts and to the drive wheels, e.g., axle shaft 54, wheels 52.

In one example, the neutral mode may have each of first clutch 115, the second clutch 120, the third clutch 126, and the reverse clutch 132 actuated open. Further, the high/low clutch 306 may be actuated to disengage the low gear 302 and high gear 304 from rotational coupling to the second shaft 48. With each of the clutches open, the first gear 112 and the third gear 124 rotate freely about the second shaft 48, the second gear 118 and the reverse gear 130 rotate freely about the first shaft 146, and the low gear 302 and the high gear 304 rotate freely about the second shaft 48.

FIGS. 6-9 depict power paths through the second CVT 100 as described with reference to FIGS. 1, 2, and 5A.

Turning first to FIG. 6, a first power path 602, a second power path 604, and a third power path 606, and a shared power path 608 are illustrated depicting a first mode of operation, e.g., gear 1 as described with reference to FIG. 5A. The shared power path 608 is shown with a thicker line and arrows indicating direction. The shared power path 608 indicates where power flows from the ICE 16, the first electric machine 20, and the second electric machine 22 converge.

In gear 1, the first power path 602 travels from the ICE 16 to the transmission input shaft 18, the transmission input shaft 18 to the ring gear 102, from the ring gear 102 to the plurality of planet gears 108, and from the plurality of planet gears 108 to the carrier output shaft or carrier output shaft 105. The second power path 604 travels from the first electric machine 20 to the EM1 transmission input shaft 32, from the EM1 transmission input shaft 32 to the EM1 transmission input gear 34, and from the EM1 transmission input gear 34 to the carrier 104. From the carrier 104, the second power path 604 travels through the plurality of planet gears 108 to converge with the first power path 602 from the plurality of planet gears 108 to the carrier output shaft 105. The third power path 606 travels from the second electric machine 22 to the EM2 transmission input shaft 36, from the EM2 transmission input shaft 36 to the EM2 transmission input gear 38, and from the EM2 transmission input gear 38 to the sun gear 106. The third power path 606 travels from the sun gear 106 to the carrier output shaft 105 to converge with the first power path 602 and the second power path 604. The shared power path 608, which flows from the carrier output shaft 105, travels from the first shaft 146 to the second fixed gear 116, from the second fixed gear 116 to the first gear 112, and from the first gear 112 to the second shaft 48. From the second shaft 48, the shared power path 608 may travel to the axle shaft 54 via the differential system 50, and to the wheels 52 (e.g., see FIG. 1) coupled to the axle shaft 54.

Turning first to FIG. 7, a first power path 702, a second power path 704, and a third power path 706, and a shared power path 708 are illustrated depicting a first mode of operation, e.g., gear 1 as described with reference to FIG. 5A. The shared power path 708 is shown with a thicker line and arrows indicating direction. The shared power path 708 indicates where power flows from the ICE 16, the first electric machine 20, and the second electric machine 22 converge.

In gear 2, the first power path 702 travels from the ICE 16 to the transmission input shaft 18, the transmission input shaft 18 to the ring gear 102, from the ring gear 102 to the plurality of planet gears 108, and from the plurality of planet gears 108 to the carrier output shaft or carrier output shaft 105. The second power path 704 travels from the first electric machine 20 to the EM1 transmission input shaft 32, from the EM1 transmission input shaft 32 to the EM1 transmission input gear 34, and from the EM1 transmission input gear 34 to the carrier 104. From the carrier 104, the second power path 704 travels through the plurality of planet gears 108 to converge with the first power path 702 from the plurality of planet gears 108 to the carrier output shaft 105. The third power path 706 travels from the second electric machine 22 to the EM2 transmission input shaft 36, from the EM2 transmission input shaft 36 to the EM2 transmission input gear 38, and from the EM2 transmission input gear 38 to the sun gear 106. The third power path 706 travels from the sun gear 106 to the carrier output shaft 105 to converge with the first power path 702 and the second power path 704. The shared power path 708, which flows from the carrier output shaft 105, travels from the second gear 118 on the first shaft 146 to the first fixed gear 110, and from the first fixed gear 110 to the second shaft 48. From the second shaft 48, the shared power path 708 may travel to the axle shaft 54 via the differential system 50, and to the wheels 52 (e.g., see FIG. 1) coupled to the axle shaft 54.

In gear 3, the first power path 802 travels from the ICE 16 to the transmission input shaft 18, the transmission input shaft 18 to the ring gear 102, from the ring gear 102 to the plurality of planet gears 108, and from the plurality of planet gears 108 to the carrier output shaft or carrier output shaft 105. The second power path 804 travels from the first electric machine 20 to the EM1 transmission input shaft 32, from the EM1 transmission input shaft 32 to the EM1 transmission input gear 34, and from the EM1 transmission input gear 34 to the carrier 104. From the carrier 104, the second power path 804 travels through the plurality of planet gears 108 to converge with the first power path 802 from the plurality of planet gears 108 to the carrier output shaft 105. The third power path 806 travels from the second electric machine 22 to the EM2 transmission input shaft 36, from the EM2 transmission input shaft 36 to the EM2 transmission input gear 38, and from the EM2 transmission input gear 38 to the sun gear 106. The third power path 806 travels from the sun gear 106 to the carrier output shaft 105 to converge with the first power path 802 and the second power path 704. The shared power path 808, which flows from the carrier output shaft 105, travels from the reverse fixed gear 128 on the first shaft 146 to the third gear 124, and from the third gear 124 to the second shaft 48. From the second shaft 48, the shared power path 808 may travel to the axle shaft 54 via the differential system 50, and to the wheels 52 (e.g., see FIG. 1) coupled to the axle shaft 54.

In reverse gear, the first power path 902 travels from the ICE 16 to the transmission input shaft 18, the transmission input shaft 18 to the ring gear 102, from the ring gear 102 to the plurality of planet gears 108, and from the plurality of planet gears 108 to the carrier output shaft or carrier output shaft 105. The second power path 904 travels from the first electric machine 20 to the EM1 transmission input shaft 32, from the EM1 transmission input shaft 32 to the EM1 transmission input gear 34, and from the EM1 transmission input gear 34 to the carrier 104. From the carrier 104, the second power path 904 travels through the plurality of planet gears 108 to converge with the first power path 902 from the plurality of planet gears 108 to the carrier output shaft 105. The third power path 906 travels from the second electric machine 22 to the EM2 transmission input shaft 36, from the EM2 transmission input shaft 36 to the EM2 transmission input gear 38, and from the EM2 transmission input gear 38 to the sun gear 106. The third power path 906 travels from the sun gear 106 to the carrier output shaft 105 to converge with the first power path 902 and the second power path 704. The shared power path 908, which flows from the carrier output shaft 105, travels from the reverse gear 130 on the first shaft 146 to the idler gear 134 positioned on the idler shaft 135, from the idler shaft 135 to the third fixed gear 122, and from the third fixed gear 122 to the second shaft 48. From the second shaft 48, the shared power path 908 may travel to the axle shaft 54 via the differential system 50, and to the wheels 52 (e.g., see FIG. 1) coupled to the axle shaft 54.

Referring to FIGS. 6-9, the controller 62 may include instructions that when executed by the controller 62 cause the controller 62 to operate one of the first clutch 115, the second clutch 120, the third clutch 126, and the reverse clutch 132 to shift between the three forward speed ratios and the reverse speed ratio based on one or more operating conditions. Further, the instructions may cause the controller 62 to operate one of the aforementioned clutches to couple one of the first gear 112, the second gear 118, the third gear 124, and the reverse gear 130 to the respective shaft, e.g., the first shaft 146 or the second shaft 48, based on one or more operating conditions. In examples where the disclosed high/low clutch is included, such as the fourth e-CVT 300 described with reference to FIG. 4, the controller 62 may additionally, or alternatively, operate the high/low clutch to shift between low gear and high gear based on one or more operating conditions. Further, the instructions may cause the controller 62 to adjust control parameters of one or more of the first inverter 140, the second inverter 142, and the ICE 16 based on one or more operating conditions. For example, the one or more operating conditions may include vehicle operating conditions such as an input device position (e.g., gearshift lever position, accelerator pedal position, and the like), engine speed, vehicle speed, vehicle load, transmission load, motor speed, engine/motor temperature, and the like.

As one example, the controller 62 may transition from gear 1 to gear 2 in response to one or both of the first electric machine 20 and the second electric machine 22 exceeding a first threshold. The controller 62 may transition from gear 2 to gear 3 in response to one of the electric machines exceeding a second threshold. In one example, the first threshold and the second threshold are positive, non-zero threshold electric machine speeds, the second threshold being greater than the first threshold. Similarly, the controller 62 may transition from gear 3 to gear 2 in response to one or both of the first electric machine 20 and the second electric machine 22 reducing below the second threshold, and from gear 2 to gear 1 in response to one or both of the electric machines reducing below the first threshold. The controller 62 may transition from one of gear 1, gear 2, and gear 3 to reverse gear in response to a gearshift lever position. In any of gear 1, gear 2, gear 3, and reverse gear, the controller 62 may adjust power to one or both of the first inverter 140 and the second inverter 142 to adjust torque output of the first electric machine 20 and the second electric machine 22, respectively. In an example case with a hybrid machine, e.g., including a battery, the controller 62 may increase power to the first inverter 140 and the second inverter 142 in response to accelerator pedal position greater than a threshold (e.g., more than 50% depressed).

In this way, the disclosed add-on design for an electric continuously variable transmission increases choice in a lower production market, such as agricultural applications, without custom design. As the e-CVT can be finished with off-the-shelf electric machines, stakeholders may relatively simply produce a line of vehicles to satisfy a variety of applications. The technical effect of the disclosed systems an e-CVT system that accommodates a variety of electric machines.

The disclosure also provides support for an assembly, comprising: a transmission at least partially enclosed in a housing, the transmission comprising a planetary gear set coupled to a multispeed sub-transmission, the planetary gear set configured to be coupled to a first electric machine and an internal combustion engine on a first side, and configured to be coupled to a second electric machine on a second side, the first side and the second defined by a vertical plane that is perpendicular to a central axis of rotation of the planetary gear set, wherein the first electric machine, the second electric machine, and the internal combustion engine are arranged outside of the housing. In a first example of the system, the planetary gear set comprises a sun gear, a ring gear, a carrier, and a carrier output shaft, the carrier configured to mesh with the first electric machine, the sun gear configured to mesh with the second electric machine, the ring gear configured to directly couple to the internal combustion engine, and the carrier output shaft coupling the planetary gear set and the multispeed sub-transmission. In a second example of the system, optionally including the first example, the multispeed sub-transmission comprises a first shaft directly connected to a carrier output shaft of the planetary gear set, a second shaft coupled to the first shaft via a plurality of gears, at least two clutches to realize two forward speeds, and at least a reverse clutch with an idler gear to realize at least one reverse speed. In a third example of the system, optionally including one or both of the first and second examples, the multispeed sub-transmission comprises a first shaft directly connected to a carrier output shaft of the planetary gear set, a second shaft coupled to the first shaft via a plurality of gears, a first clutch and a high/low clutch to realize two forward speeds, and a first reverse clutch with an idler gear and the high/low clutch to realize two reverse speeds. In a fourth example of the system, optionally including one or more or each of the first through third examples, the multispeed sub-transmission comprises a first shaft directly connected to a carrier output shaft of the planetary gear set, a second shaft coupled to the first shaft via a plurality of gears, a first clutch, a second clutch and a third clutch to realize three forward speeds, and a first reverse clutch with an idler gear to realize one reverse speed. In a fifth example of the system, optionally including one or more or each of the first through fourth examples, the system further comprises: a power take-off (PTO) system comprising a first transmission input shaft configured to couple to the internal combustion engine, a PTO shaft meshed with the first transmission input shaft, a first PTO gear coupled to the PTO shaft, a first input-coupled gear coupled to the first transmission input shaft and meshing with the first PTO gear, and at least a first PTO clutch for selectively fixedly rotationally coupling the first PTO gear to the PTO shaft. In a sixth example of the system, optionally including one or more or each of the first through fifth examples, the system further comprises: a first power take-off (PTO) system comprising a first transmission input shaft configured to couple to the internal combustion engine, a PTO shaft meshed with the first transmission input shaft, a first PTO gear coupled to the PTO shaft, a first input-coupled gear coupled to the first transmission input shaft and meshing with the first PTO gear, a first PTO clutch for selectively fixedly rotationally coupling the first PTO gear to the PTO shaft, a second PTO gear coupled to the PTO shaft, a second input-coupled gear coupled to the first transmission input shaft and meshing with the second PTO gear, and a second PTO clutch for selectively fixedly rotationally coupling the first PTO gear to the PTO shaft. In a seventh example of the system, optionally including one or more or each of the first through sixth examples, the system further comprises: a high/low gear set comprising a second shaft directly coupled to the multispeed sub-transmission, a low gear selectively fixedly rotationally coupled to the second shaft, a high gear selectively fixedly rotationally coupled to the second shaft, and a high/low clutch for selectively fixedly rotationally coupling one of the low gear and the high gear to the second shaft. In a eighth example of the system, optionally including one or more or each of the first through seventh examples, the multispeed sub-transmission is coupled to the planetary gear set on the second side. In a ninth example of the system, optionally including one or more or each of the first through eighth examples, the system further comprises: a battery configured to be coupled to the first electric machine and the second electric machine.

The disclosure also provides support for a transmission comprising: a planetary gear set comprising a sun gear, a carrier, a ring gear, and a carrier output shaft, a first transmission input shaft directly connected to the ring gear, the first transmission input shaft configured to be coupled to an internal combustion engine, a second transmission input shaft meshed with the carrier, the second transmission input shaft configured to be coupled to a first electric machine, a third transmission input shaft meshed with the sun gear, the third transmission input shaft configured to be coupled to a second electric machine, a PTO shaft meshed with the first transmission input shaft and selectively engaged, via at least a first PTO clutch, with the first transmission input shaft, a multispeed sub-transmission directly connected to the carrier output shaft and a second shaft, and a housing comprising the multispeed sub-transmission and the planetary gear set, wherein at least a portion of the first transmission input shaft, the second transmission input shaft, and the third transmission input shaft are arranged outside of the housing. In a first example of the system, the multispeed sub-transmission comprises a first shaft directly connected to the carrier output shaft of the planetary gear set, the second shaft coupled to the first shaft via a plurality of gears, at least two clutches to realize two forward speeds, and at least a reverse clutch with an idler gear to realize at least one reverse speed. In a second example of the system, optionally including the first example, the system further comprises: a first PTO gear coupled to the PTO shaft, a first input-coupled gear coupled the first transmission input shaft and meshing with the first PTO gear, wherein the at least a first PTO clutch selectively fixedly rotationally couples the first PTO gear to the PTO shaft. In a third example of the system, optionally including one or both of the first and second examples, the system further comprises: a second PTO gear coupled to the PTO shaft, a second input-coupled gear coupled the first transmission input shaft and meshing with the second PTO gear, and a second PTO clutch for selectively fixedly rotationally coupling the second input-coupled gear to the first transmission input shaft. In a fourth example of the system, optionally including one or more or each of the first through third examples, the system further comprises: a high/low gear set comprising a low gear selectively fixedly rotationally coupled to the second shaft, a high gear selectively fixedly rotationally coupled to the second shaft, and a high/low clutch for selectively fixedly rotationally coupling one of the low gear and the high gear to the second shaft.

The disclosure also provides support for a method for a transmission comprising a planetary gear set coupled to a multispeed sub-transmission, wherein the multispeed sub-transmission selectively couples a power path between a carrier output shaft of the planetary gear set and a second shaft, and wherein the planetary gear set is configured to be coupled to a first electric machine and an internal combustion engine on a first side, and configured to be coupled to a second electric machine on a second side, the first side and the second defined by a vertical plane that is perpendicular to a central axis of rotation of the planetary gear set, the method comprising: receiving one or more operating conditions, selecting a mode of operation based on the one or more operating conditions, and adjusting at least one of a plurality of clutches based on the mode of operation. In a first example of the method, the plurality of clutches comprise at least a first clutch and a second clutch for realizing two forward speeds, and at least a reverse clutch with an idler gear to realize at least one reverse speed. In a second example of the method, optionally including the first example, the plurality of clutches comprise a first clutch and a high/low clutch to realize two forward speeds, and a reverse clutch with an idler gear and the high/low clutch to realize two reverse speeds. In a third example of the method, optionally including one or both of the first and second examples, the plurality of clutches comprise a first clutch, a second clutch, and a third clutch to realize three forward speeds, and a reverse clutch with an idler gear for realizing a reverse speed. In a fourth example of the method, optionally including one or more or each of the first through third examples, in a first operating mode comprising the first clutch in a closed position, the second clutch in an open position, the third clutch in the open position, and the reverse clutch in the open position, a first power path couples the carrier output shaft to the second shaft via a second gear arranged on a first shaft coupled to the carrier output shaft, the second gear in meshed engagement with a first fixed gear arranged on the second shaft, wherein in a second operating mode comprising the second clutch in the closed position, the first clutch in the open position, the third clutch in the open position, and the reverse clutch in the open position, a second power path couples the carrier output shaft to the second shaft via a first gear arranged on the second shaft in meshed engagement with a second fixed gear arranged on the first shaft, wherein in a third operating mode comprising the third clutch in the closed position, the first clutch in the open position, the second clutch in the open position, and the reverse clutch in the open position, a third power path couples the carrier output shaft to the second shaft via a reverse fixed gear arranged on the first shaft in meshed engagement with a third gear arranged on the second shaft, and wherein in a reverse operating mode comprising the reverse clutch in the closed position, the first clutch in the open position, the second clutch in the open position, and the third clutch in the open position, a reverse power path couples the carrier output shaft to the second shaft via a reverse gear arranged on the first shaft.

In another representation, an assembly comprising: a planetary gear set comprising a sun gear, a ring gear, a carrier, and a carrier output shaft, the carrier configured to mesh with a first electric machine and the sun gear configured to mesh with a second electric machine; a multispeed sub-transmission directly coupled to the carrier output shaft, comprising at least a first clutch to realize at least a first forward speed and a second clutch to realize a second forward speed, and at least a reverse clutch with an idler gear to realize a first reverse speed; a housing comprising the planetary gear set and the multispeed sub-transmission; and an internal combustion engine directly coupled to the ring gear; wherein the first electric machine and the second electric machine are not integrated in the housing.

FIGS. 1-4, and 6-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

Note that the example control and estimation routines included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer readable storage medium in the vehicle and/or drivetrain control system. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations, and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric motors, internal combustion engines, and/or transmissions. The technology can be used as a stand-alone, or used in combination with other power transmission systems not limited to machinery and propulsion systems for tandem axles, electric tag axles, P4 axles, hybrid electric vehicles (HEVs), BEVs, agriculture, marine, motorcycle, recreational vehicles and on and off highway vehicles, as an example. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An assembly, comprising:
a transmission at least partially enclosed in a housing, the transmission comprising a planetary gear set coupled to a multispeed sub-transmission, the planetary gear set configured to be coupled to a first electric machine and an internal combustion engine on a first side, and configured to be coupled to a second electric machine on a second side, the first side and the second side defined by a vertical plane that is perpendicular to a central axis of rotation of the planetary gear set, wherein the first electric machine, the second electric machine, and the internal combustion engine are arranged outside of the housing, and further comprising a battery configured to be coupled to the first electric machine and the second electric machine, the internal combustion engine coupled to the transmission via a different input shaft than each of the first electric machine and the second electric machine, wherein the internal combustion engine, the first electric machine, and the second electric machine are each positioned on a same side of the vertical plane.

2. The assembly of claim 1, wherein the planetary gear set comprises a sun gear, a ring gear, a carrier, and a carrier output shaft, the carrier configured to couple with the first electric machine, the sun gear configured to couple with the second electric machine, the ring gear configured to directly couple to the internal combustion engine, and the carrier output shaft coupling the planetary gear set and the multispeed sub-transmission.

3. The assembly of claim 1, wherein the multispeed sub-transmission comprises a first shaft directly connected to a carrier output shaft of the planetary gear set, a second shaft coupled to the first shaft via a plurality of gears, at least two clutches to realize two forward speeds, and at least a reverse clutch with an idler gear to realize at least one reverse speed.

4. The assembly of claim 1, wherein the multispeed sub-transmission comprises a first shaft directly connected to a carrier output shaft of the planetary gear set, a second shaft coupled to the first shaft via a plurality of gears, a first clutch and a high/low clutch to realize two forward speeds, and a first reverse clutch with an idler gear and the high/low clutch to realize two reverse speeds.

5. The assembly of claim 1, wherein the multispeed sub-transmission comprises a first shaft directly connected to a carrier output shaft of the planetary gear set, a second shaft coupled to the first shaft via a plurality of gears, a first clutch, a second clutch, and a third clutch to realize three forward speeds, and a first reverse clutch with an idler gear to realize one reverse speed.

6. The assembly of claim 1, further comprising a power take-off (PTO) system comprising a first transmission input shaft configured to couple to the internal combustion engine, a PTO shaft coupled with the first transmission input shaft, a first PTO gear coupled to the PTO shaft, a first input-coupled gear coupled to the first transmission input shaft and coupled with the first PTO gear, and at least a first PTO clutch for selectively fixedly rotationally coupling the first PTO gear to the PTO shaft.

7. The assembly of claim 1, further comprising a high/low gear set comprising a second shaft directly coupled to the multispeed sub-transmission, a low gear selectively fixedly rotationally coupled to the second shaft, a high gear selectively fixedly rotationally coupled to the second shaft, and a high/low clutch for selectively fixedly rotationally coupling one of the low gear and the high gear to the second shaft.

8. The assembly of claim 1, wherein the multispeed sub-transmission is coupled to the planetary gear set on the second side.

9. A transmission comprising:
a planetary gear set comprising a sun gear, a carrier, a ring gear, and a carrier output shaft;
a first transmission input shaft directly connected to the ring gear, the first transmission input shaft configured to be coupled to an internal combustion engine;
a second transmission input shaft coupled with the carrier, the second transmission input shaft configured to be coupled to a first electric machine;
a third transmission input shaft coupled with the sun gear, the third transmission input shaft configured to be coupled to a second electric machine;
a PTO shaft coupled with the first transmission input shaft and selectively engaged, via at least a first PTO clutch, with the first transmission input shaft;
a multispeed sub-transmission directly connected to the carrier output shaft and a second shaft; and
a housing comprising the multispeed sub-transmission and the planetary gear set;
wherein at least a portion of the first transmission input shaft, the second transmission input shaft, and the third transmission input shaft are arranged outside of the housing.

10. The transmission of claim 9, wherein the multispeed sub-transmission comprises a first shaft directly connected to the carrier output shaft of the planetary gear set, the second shaft coupled to the first shaft via a plurality of gears, at least two clutches to realize two forward speeds, and at least a reverse clutch with an idler gear to realize at least one reverse speed.

11. The transmission of claim 9, further comprising a high/low gear set comprising a low gear selectively fixedly rotationally coupled to the second shaft, a high gear selectively fixedly rotationally coupled to the second shaft, and a high/low clutch for selectively fixedly rotationally coupling one of the low gear and the high gear to the second shaft.

12. A method for a transmission comprising a planetary gear set coupled to a multispeed sub-transmission, wherein the multispeed sub-transmission selectively couples a power path between a carrier output shaft of the planetary gear set and a shaft, and wherein the planetary gear set is configured to be coupled to a first electric machine and an internal combustion engine on a first side, and configured to be coupled to a second electric machine on a second side, the first side and the second side defined by a vertical plane that is perpendicular to a central axis of rotation of the planetary gear set, the method comprising:

receiving one or more operating conditions;

selecting a mode of operation based on the one or more operating conditions; and adjusting at least one of a plurality of clutches based on the mode of operation, wherein the internal combustion engine, the first electric machine, and the second electric machine are each positioned on a same side of the vertical plane.

13. The method of claim 12, wherein the plurality of clutches comprise at least a first clutch and a second clutch for realizing two forward speeds, and at least a reverse clutch with an idler gear to realize at least one reverse speed.

14. The method of claim 12, wherein the plurality of clutches comprise a first clutch and a high/low clutch to realize two forward speeds, and a reverse clutch with an idler gear and the high/low clutch to realize two reverse speeds.

15. The method of claim 12, wherein the plurality of clutches comprise a first clutch, a second clutch, and a third clutch to realize three forward speeds, and a reverse clutch with an idler gear for realizing a reverse speed.

16. The method of claim 15, wherein in a first operating mode comprising the first clutch in a closed position, the second clutch in an open position, the third clutch in the open position, and the reverse clutch in the open position, a first power path couples the carrier output shaft to the shaft via a second gear arranged on a first shaft coupled to the carrier output shaft, the second gear in meshed engagement with a first fixed gear arranged on the shaft;

wherein in a second operating mode comprising the second clutch in the closed position, the first clutch in the open position, the third clutch in the open position, and the reverse clutch in the open position, a second power path couples the carrier output shaft to the shaft via a first gear arranged on the shaft in meshed engagement with a second fixed gear arranged on the first shaft;

wherein in a third operating mode comprising the third clutch in the closed position, the first clutch in the open position, the second clutch in the open position, and the reverse clutch in the open position, a third power path couples the carrier output shaft to the shaft via a reverse fixed gear arranged on the first shaft in meshed engagement with a third gear arranged on the shaft; and wherein in a reverse operating mode comprising the reverse clutch in the closed position, the first clutch in the open position, the second clutch in the open position, and the third clutch in the open position, a reverse power path couples the carrier output shaft to the shaft via a reverse gear arranged on the first shaft.

\* \* \* \* \*